United States Patent
Jones et al.

(10) Patent No.: US 9,218,215 B2
(45) Date of Patent: Dec. 22, 2015

(54) JOB SCHEDULING IN A SYSTEM OF MULTI-LEVEL COMPUTERS

(71) Applicant: International Business Machines Corporation, Armonk, NY (US)

(72) Inventors: Steven B. Jones, Poughkeepsie, NY (US); Brian Keuling, Poughkeepsie, NY (US); Thomas J. Wasik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/792,591

(22) Filed: Mar. 11, 2013

(65) Prior Publication Data

US 2014/0259021 A1     Sep. 11, 2014

(51) Int. Cl.
*G06F 9/46* (2006.01)
*G06F 9/50* (2006.01)

(52) U.S. Cl.
CPC .................. *G06F 9/5055* (2013.01)

(58) Field of Classification Search
None
See application file for complete search history.

(56) References Cited

U.S. PATENT DOCUMENTS

| | | | |
|---|---|---|---|
| 2011/0061057 A1* | 3/2011 | Harris et al. | 718/104 |
| 2012/0054756 A1* | 3/2012 | Arnold et al. | 718/102 |
| 2013/0247061 A1* | 9/2013 | Kiehn | 718/104 |

\* cited by examiner

*Primary Examiner* — Sisley Kim
(74) *Attorney, Agent, or Firm* — Cantor Colburn LLP; William A. Kinnaman, Jr.

(57) ABSTRACT

Systems, methods, and computer program products for job scheduling are disclosed. An exemplary computer-implemented method includes receiving a job in a job scheduling system. At least part of the job is transmitted to a job reader. An indication of one or more functions required for performing the job is received from the job reader. A first computing device is selected from among a plurality of computing devices, where the selection is based, at least in part, on whether the first computing device supports the functions required for performing the job.

15 Claims, 3 Drawing Sheets

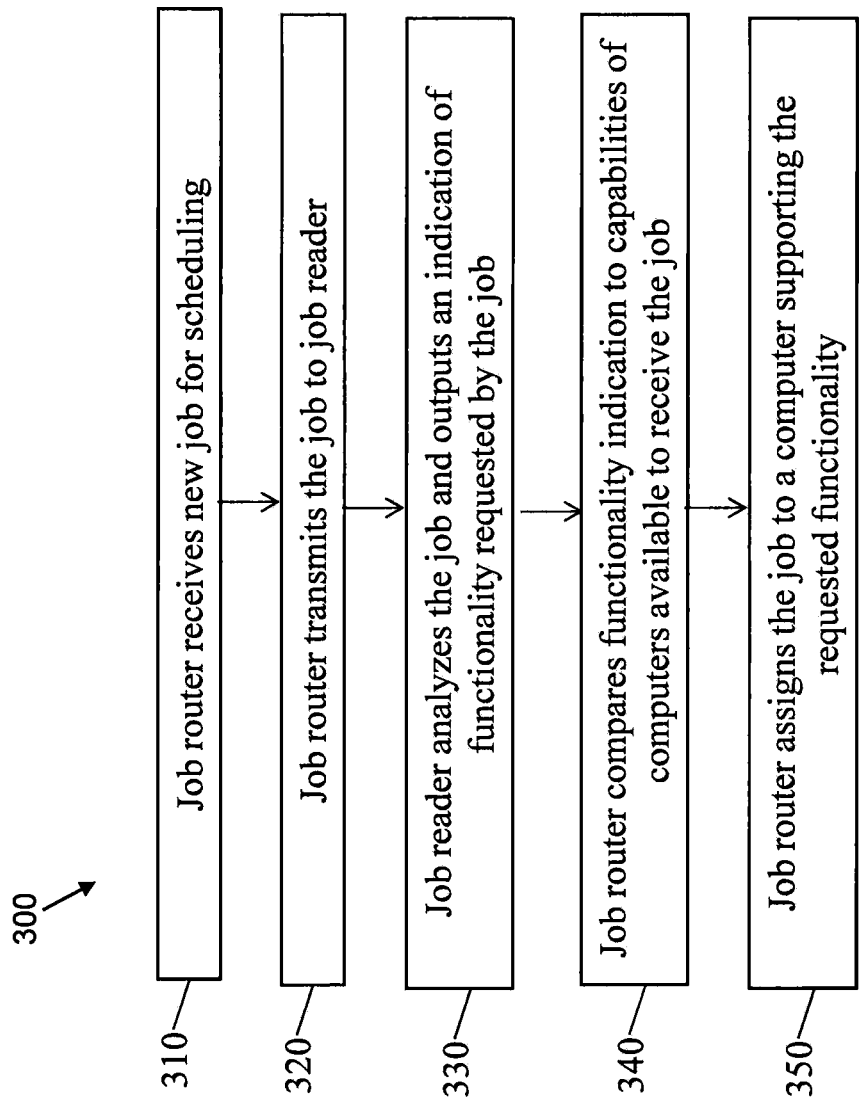

JOB SCHEDULING IN A SYSTEM OF MULTI-LEVEL COMPUTERS

BACKGROUND

The present disclosure relates to job scheduling and, more particularly, to scheduling jobs in system having multiple computers of various levels, supporting various functionalities.

When developing new functionality that is to be enabled at the job control language (JCL) level, one has to consider that a job can be converted on one computer and then executed on a different computer within a sysplex, or other system of multiple computers.

Within a multi-computer system, each computer need not run the same release of the same operating system. As such, the computers may not all support the same functionalities. In general, a computer that supports more functionality than another is referred to herein as an "uplevel" system, and a computer that does not support certain functionality is referred to as a "downlevel" system. "Uplevel" and "downlevel" are thus relative terms.

When a job is converted on an uplevel system, and includes functionality only supported by certain releases of an operating system, the job may require functionality that is not supported on a downlevel system. If the job is then assigned to and executed by a downlevel system, a compatibility issue may arise. Conventionally, this issue is solved via an enhancement to the downlevel system enabling it to understand a function it cannot perform. Sometimes this enhancement is as small as accepting but ignoring a JCL keyword indicating the missing functionality. In other words, although the downlevel system would not execute the command, it would also not throw an error. In some cases, however, the enhancement is much more substantial. Regardless, if executed by a downlevel system that does not support the requested functionality, a job does not perform as it was intended to.

SUMMARY

Various embodiments of this disclosure include methods, systems, and computer program products for scheduling jobs within a multi-computer system with computers supporting various levels of functionality.

According to one embodiment, a computer-implemented method includes receiving a job in a job scheduling system. At least part of the job is transmitted to a job reader. An indication of one or more functions required for performing the job is received from the job reader. A first computing device is selected from among a plurality of computing devices, where the selection is based, at least in part, on whether the first computing device supports the functions required for performing the job.

In another embodiment, a scheduling system includes a job router and a job reader. The job router may be configured to receive a job and to assign the job to at least one of a plurality of computing devices available to perform the job. The job reader may be configured to receive the job from the job router, to analyze the job, and to output an indication of one or more functions required for performing the job. The job router may be further configured to select a first computing device from the plurality of computing devices based, at least in part, on whether the first computing device supports the functions required for performing the job.

In yet another embodiment, a computer program product includes a computer readable storage medium having computer readable program code embodied thereon. The computer readable program code is executable by a processor to perform a method that includes receiving a job in a job scheduling system. According to the method, at least part of the job is transmitted to a job reader. An indication of one or more functions required for performing the job is received from the job reader. A first computing device is selected from among a plurality of computing devices, where the selection is based, at least in part, on whether the first computing device supports the functions required for performing the job.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE DRAWINGS

The forgoing and other features, and advantages of the disclosure are apparent from the following detailed description taken in conjunction with the accompanying drawings in which:

FIG. 3 illustrates a flow diagram of a method for job scheduling, according to an exemplary embodiment of this disclosure.

DETAILED DESCRIPTION

Various embodiments of this disclosure address job scheduling in a system of computers having different levels of functionality. According to an exemplary embodiment, when a job is to be assigned to a computer for handling, a job router may first forward the job to a job reader for analysis. The job reader may analyze the job and inform the job router of which level of computer is needed to service the job with the full functionality indicated by the job's code. The job router may then assign the job to a computer that has at least the level indicated by the job reader. As a result, no job may be executed by a computer that is not suited to handle all functionality requested for the job.

It will be understood that, although examples in this disclosure may refer to jobs being provided in JCL, the various embodiments are not limited to JCL. Rather, the present systems, methods, and computer program products may be applied to scheduling jobs written in other scripting or programming languages.

Figure 1:
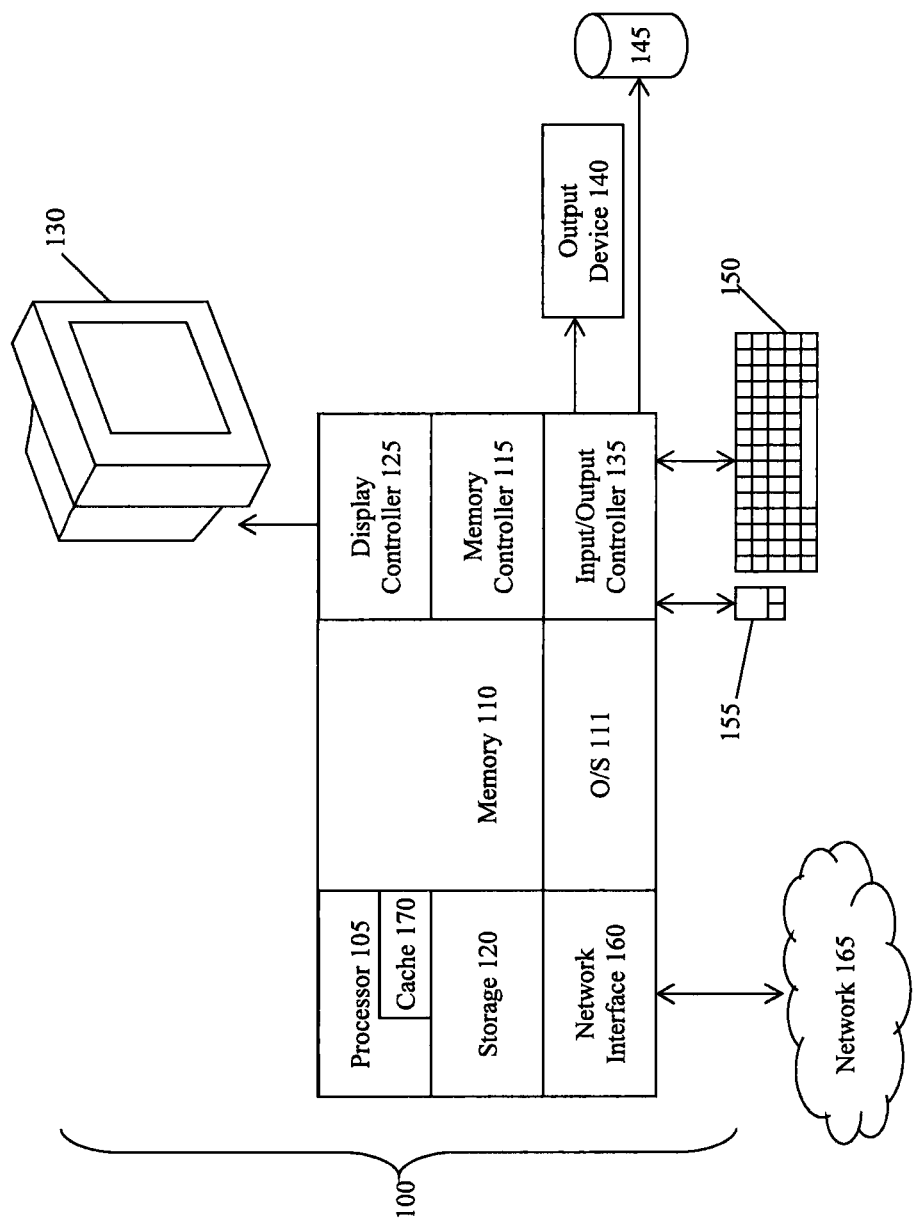
FIG. 1 illustrates a block diagram of a computing device useable with a system according to this disclosure.

FIG. 1 illustrates a block diagram of a computing device 100 for use in practicing teachings of this disclosure, according to some embodiments. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
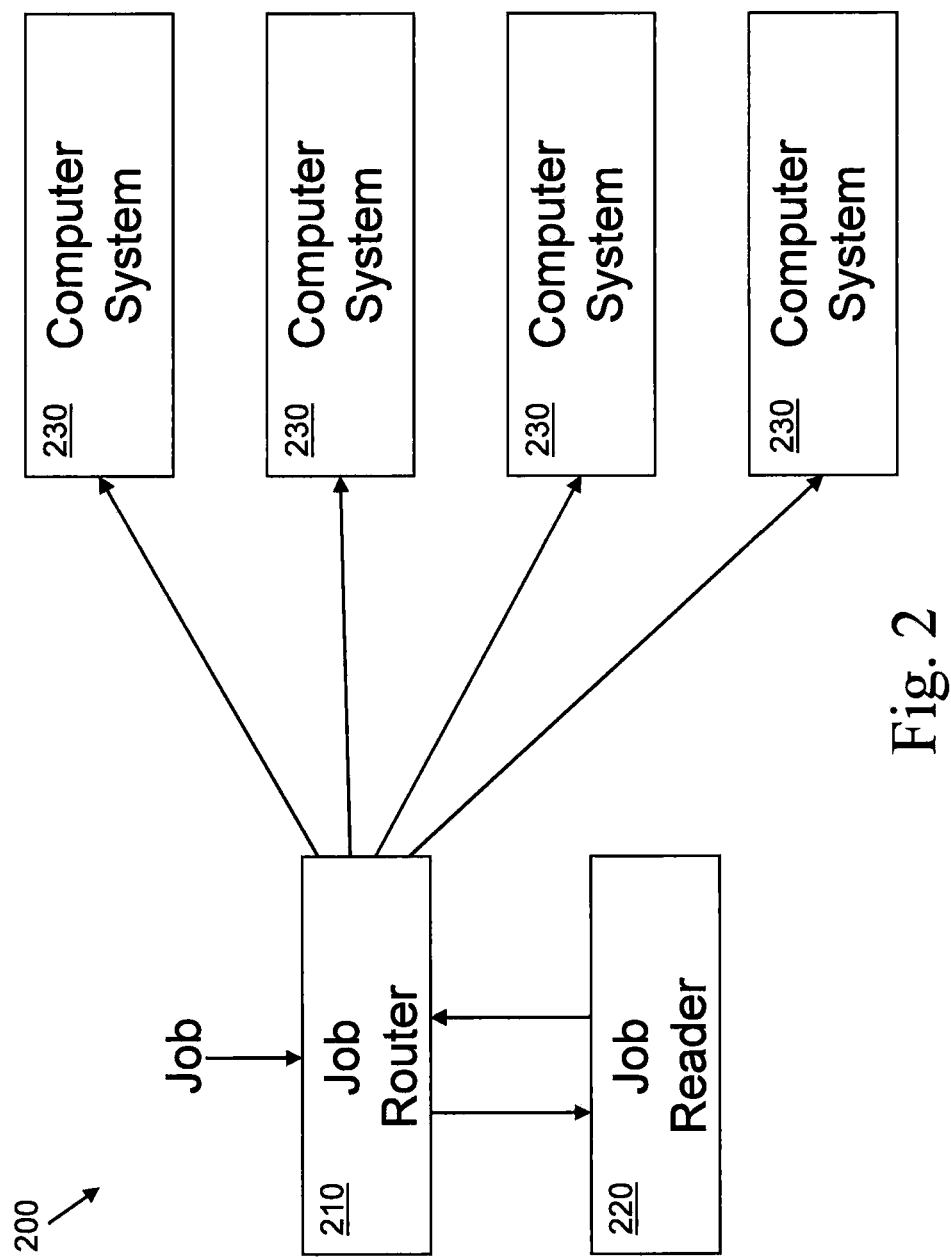
FIG. 2 illustrates a block diagram of a scheduling system, according to an exemplary embodiment of this disclosure.

FIG. 2 illustrates a block diagram of a scheduling system 200, according to an exemplary embodiment of this disclosure. As shown, the scheduling system 200 may comprise a job router 210, a job reader 220, and two or more computer systems 230, such as the computers 100 shown in FIG. 1, to which jobs may be assigned. It will also be understood that one or both of the job router 210 and job reader 220 may be embodied, in whole or in part, in computers 100, such as that shown in FIG. 1.

To ensure that jobs are given the full functionality that is coded for, embodiments of the invention include a functionality criterion, in addition to conventional selection criteria for job scheduling. While embodiments may still consider conventional criteria, such as, for example, current availability and processor speed, this additional functionality criterion may also be considered.

The scheduling system 200 may determine whether the job requests certain advanced functionality and may route jobs that request advanced functionality to only those computer systems 230 that can provide such functionality. Accordingly, the scheduling system 200 may ensure that each job ends up with the appropriate control blocks necessary to perform the requested functionality. As a result, users may be guaranteed that the jobs they submit will get advanced functionality, if requested, and less code need be implemented for downlevel systems to tolerate new commands.

When a job is received at the job router 210, which may be unable to analyze the job code, the job router 210 may forward all or a portion of the job to the job reader 220. The job reader may be capable of reading the job at least to extract code portions that refer to functionality not supported by all computers 230 serviced by the scheduling system 200.

The job reader 220 may receive job code as input, and may output a functionality indication, which indicates the functions required to complete the job as written. For example, if the various levels of computer systems 230 in the scheduling system 200 are represented by numbers, where a higher number represents a higher level of capability, the job reader 220 may output the number representing the minimum capability level to execute the job. It will be understood, however, that various representations of capability may be used, so long as the job reader 220 outputs an indication of the requested functions, as can be understood by the job router 210.

The job router 210 may be aware of the capabilities of each computer system 230 to which it may assign jobs. For example, and not by way of limitation, an identifier if each computer system 230 may be associated with its capability level or with indications of the various advanced functions it supports. These associations may be stored in a table, database, or other storage structure to which the job router 210 has access. In some implementations, the storage structure may indicate that a computer system 230 can handle all jobs requiring no more than a certain level of functionality. In some other implementations, the storage structure may list all the various advanced functions each computer 230 can handle, such that a computer 230 may be assigned only those jobs that do not require advanced functions outside the computer system's associated list.

After the job reader 220 analyzes a job and returns a functionality indication to the job router 210, the job router 210 may assign the job to one or more of the computer systems 230 that can handle the functions indicated by the functionality indication. Thus, the job router 210 may assign the job to only those computer systems 230 that can provide the full functionality requested by the job. In the case of a job that requires only the lowest level of functionality provided from among all the computer systems 230, the job router 210 need not exclude any of the computer systems 230 based on functionality, and may assign the job based entirely on other scheduling criteria.

If the job reader 220 indicates that a job requires one or more functions that are not provided by any currently available computer 230, the job router 210 may place the job on a queue until a computer 230 with the required capabilities becomes available. The scheduling system 200 may provide a command that an administrator, or job provider, can use to view the jobs waiting in this queue. The administrator or job provider can then opt to modify a queued job to change the functions required to perform the job, thus potentially enabling the job to be removed from the queue.

An advantage of embodiments of this disclosure is that the scheduling system 200 can guarantee that a function requested by a job is actually performed. This means that technicians who generate jobs to test out new functions will always receive the requested new functionality. In conventional job scheduling, there is no assurance that requested functions will be performed, since the job could be executed on a downlevel computer that cannot perform the specific functions needed.

Embodiments of this disclosure may additionally reduce the risk of creating problems by presenting code toleration in downlevel systems. While sometimes code added to downlevel systems to tolerate new functions can be as simple as ignoring a new JCL keyword, there are cases that require more coding and, therefore, increased chances of introducing errors. According to the present disclosure, however, the risk of upgrading code on previous software releases is mitigated due to jobs being routed only to systems that have the appropriate level of software. Downlevel systems may still need to include software to ignore new keywords, which software would be utilized, for example, when handling a job that specifically mentions a new keyword for the purpose of indicating that the associated functionality is not used.

FIG. 3 illustrates a flow diagram of a method for job scheduling, according to an exemplary embodiment of this disclosure. As shown, at block 310, a job router 210 may receive a new job. At block 320, the job router 220 may transmit the job, or a portion of the new job's code, to a job reader 220. At block 330, the job reader 220 may analyze the job to output an indication of functionality requested by the job. At block 340, the job router 210 may compare the requested functionality to a set of computer systems 230 available to receive the job. At block 350, the job router 210 may assign the job to a computer system 230 capable of performing the requested functionality of the job.

In one example implementation of the scheduling system 200, a Job Entry Subsystem 2 (JES2) acted as a job router 210, and a JCL Reader/Converter acted as a job reader 220. All of the computer systems 230 to which jobs could be assigned used various releases of the same operating system.

In this implementation, when a job was received, JES2 210 passed the job to the Converter 220 to read the JCL statements of the job. The Converter 220 determined the job's attributes based on its reading. If a new function was requested, the Converter 220 returned an indicator to JES2 210 as to which release of the operating system was required to handle the job while providing all requested functionality. JES2 210 checked the returned indicator and routed the job only to those computer systems that had the appropriate versions of the operating system, as indicated by the Converter 220. Thus, systems not supporting the indicated functionality were excluded from receiving the job in question.

The above implementation is described for illustrative purposes only. It will be understood that other implementations may be provided in accordance with this disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and "comprising," when used in this specification, specify the presence of stated features, integers, steps, operations, elements, or components, but do not preclude the presence or addition of one or more other features, integers, steps, operations, element components, or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments described were chosen to best explain the principles of the disclosure and the practical applications, and to enable others of ordinary skill in the art to understand the disclosure for various embodiments, with various modifications as are suited to the particular use contemplated or other uses.

The flow diagrams depicted herein are just particular examples. There may be many variations to these diagrams or the operations described therein without departing from the spirit of the disclosure. For instance, the operations may be performed in a differing order or steps may be added, deleted, or modified. All of these variations are considered a part of the disclosure.

While exemplary embodiments of the disclosure have been described, it will be understood to those skilled in the art that improvements and enhancements may be made within the scope of the following claims.

What is claimed is:

1. A computer-implemented method comprising:
receiving a job in a job scheduling system;
transmitting at least part of the job to a job reader;
reading, by the job reader, one or more code portions of the job;
determining, by a computer processor associated with the job reader, based on reading the one or more code portions of the job, one or more functions that are found in the one or more code portions of the job and are required to be executed for performing the job, wherein the job reader is configured to output an indicator to a job router as to which version of an operating system is required to handle the job;

determining availability of a plurality of functions, comprising at least the one or more functions, in each of a plurality of computing devices;

identifying a subset of the plurality of computing devices, wherein each computing device in the subset of the plurality of computing devices supports the one or more functions required for performing the job; and selecting a first computing device from among the subset of the plurality of computing devices based, at least in part, on the first computing device supporting the one or more functions required for performing the job.

2. The method of claim 1, further comprising providing, by the job reader, an indication of a minimum capability level required for performing the job.

3. The method of claim 1, further comprising placing the job on a waiting queue if no available computing devices from the plurality of computing devices support the one or more functions required for performing the job.

4. The method of claim 3, further comprising displaying a list of jobs on the waiting queue upon request.

5. The method of claim 1, wherein the plurality of computing devices together run more than a single operation system version.

6. A scheduling system comprising:

a job router configured to receive a job and to assign the job to at least one of a plurality of computing devices available to perform the job; and a job reader configured to:

read one or more code portions of the job; and determine, by a computer processor, based on reading the one or more code portions of the job, one or more functions that are found in the one or more code portions of the job and are required to be executed for performing the job, wherein the job reader is configured to output an indicator to the job router as to which version of an operating system is required to handle the job;

wherein the job router is further configured to:

determine availability of a plurality of functions, comprising at least the one or more functions, in each of a plurality of computing devices;

identify a subset of the plurality of computing devices, wherein each computing device in the subset of the plurality of computing devices supports the one or more functions required for performing the job; and select a first computing device from the subset of the plurality of computing devices based, at least in part, on the first computing device supporting the one or more functions required for performing the job.

7. The system of claim 6, the job reader being configured to provide an indication of a minimum capability level required for performing the job.

8. The system of claim 6, the job router being configured to place the job on a waiting queue if no available computing devices from the plurality of computing devices support the one or more functions required for performing the job.

9. The system of claim 8, the job router being further configured to display a list of jobs on the waiting queue upon request.

10. The system of claim 6, wherein the plurality of computing devices together run more than a single operating system version.

11. A computer program product comprising a non-transitory computer readable storage medium having computer readable program code embodied thereon, the computer readable program code executable by a processor to perform a method comprising:

receiving a job in a job scheduling system;

transmitting at least part of the job to a job reader;

reading, by the job reader, one or more code portions of the job;

determining, by the job reader, based on reading the one or more code portions of the job, one or more functions that are found in the one or more code portions of the job and are required to be executed for performing the job, wherein the job reader is configured to output an indicator to a job router as to which version of an operating system is required to handle the job;

determining availability of a plurality of functions, comprising at least the one or more functions, in each of a plurality of computing devices;

identifying a subset of the plurality of computing devices, wherein each computing device in the subset of the plurality of computing devices supports the one or more functions required for performing the job; and selecting a first computing device from among the subset of the plurality of computing devices based, at least in part, on whether the first computing device supporting the one or more functions required for performing the job.

12. The computer program product of claim 11, the method further comprising providing, by the job reader, an indication of a minimum capability level required for performing the job.

13. The computer program product of claim 11, the method further comprising placing the job on a waiting queue if no available computing devices from the plurality of computing devices support the one or more functions required for performing the job.

14. The computer program product of claim 13, the method further comprising displaying a list of jobs on the waiting queue upon request.

15. The computer program product of claim 11, wherein the plurality of computing devices together run more than a single operating system version.

* * * * *